Feb. 19, 1952 — H. B. RIGGS — 2,586,090
AIR DEFLECTOR FOR AUTOMOBILE WINDOWS
Filed Aug. 18, 1950
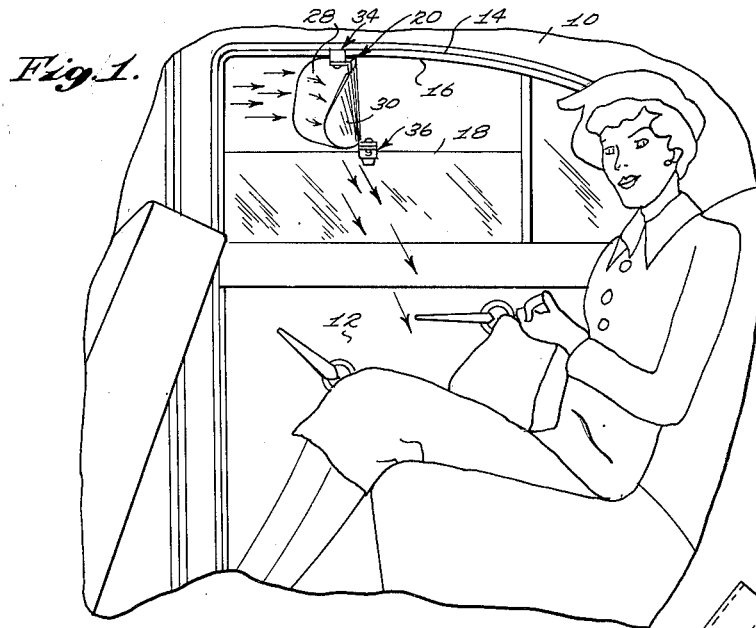
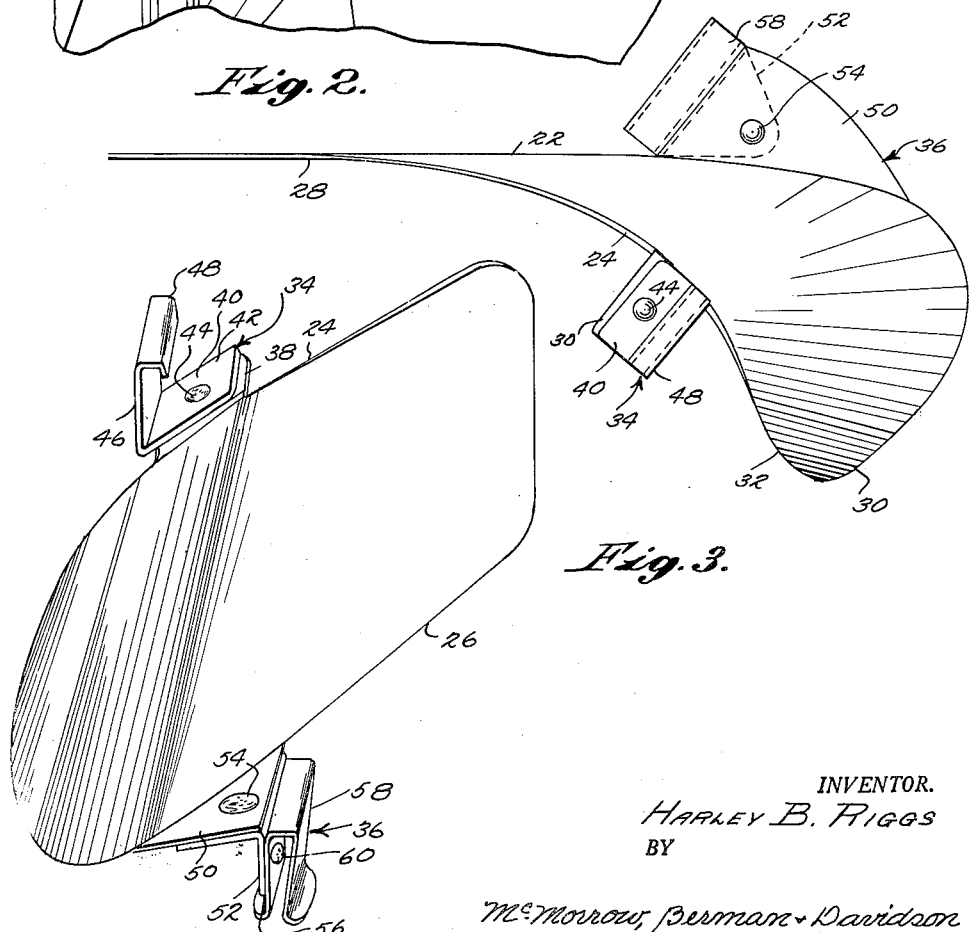
INVENTOR.
HARLEY B. RIGGS
BY
McMorrow, Berman & Davidson
ATTORNEYS Patented Feb. 19, 1952

2,586,090

UNITED STATES PATENT OFFICE 2,586,090

AIR DEFLECTOR FOR AUTOMOBILE WINDOWS

Harley B. Riggs, Louisville, Ky.

Application August 18, 1950, Serial No. 180,286

5 Claims. (Cl. 296—44)

This invention appertains to improvements in air deflectors for vehicles and has for its primary object to provide an air deflector for detachable interpositioning between the side window frame and the upper edge of the vertically slidable window glass, the deflector being shaped to deflect air inwardly and downwardly of the vehicle.

Another object of this invention is to permit the rear side windows of an automobile vehicle to be opened for the comfort of passengers seated in the rear of the vehicle by collecting the air currents normally passing through the open window and to the interior of the vehicle and directing the air currents downwardly along the inside of the rear doors for indirect circulation through the vehicle.

These and ancillary objects and structural features of merit are attained by this invention, the preferred embodiment of which is set forth in the following description and illustrated in the accompanying drawing, wherein:

Figure 1 is a fragmentary elevational view of the interior of a vehicle, with an air deflector, constructed in accordance with the principles of this invention, operatively positioned in the window opening and interposed between the vertically slidable window glass and the window frame;

Figure 2 is a top plan view of the air deflector, and

Figure 3 is an isometric view thereof.

Referring now more particularly to the drawing, for exemplary purposes, a portion of the vehicle 10 is depicted, the same including a door 12, which is provided with the usual window opening 14. A window frame 16 is provided and a vertically slidable window glass 18 is conventionally mounted therein.

The air deflector 20 is adapted to be positioned vertically between the frame 16 and the upper edge of the window glass 18, so as to receive the oncoming air currents and deflect the air currents downwardly into the vehicle for recirculation through the vehicle in an indirect manner.

The air deflector 20 is formed from an oblong member 22 of flat sheet material, which is provided with an upper edge 24 and a lower edge 26.

A straight air guide member or leading or forward end 28 is formed on the member and the rearward end 30 is rounded. In this respect, the upper edge 24 is inclined downwardly relative to the rearward end 30 and the upper edge 32 of the rearward or trailing end is bent downwardly to form a rearwardly and downwardly directed scoop or air channel.

Means is provided for detachably mounting the air deflector is a vertical position between the frame and the window glass, the means including clamping means 34 formed on the upper edge 24 and clamping means 36 formed on the lower edge 26.

The clamping means 34 includes an apertured lug 38 struck outwardly in a lateral direction from the edge 24 and pivotally supporting an angular clamp 40. The angular clamp 40 is formed with a horizontal flange 42 pivotally superimposed on the lug 38 by a rivet 44 and a vertical flange 46 which terminates at its upper edge in an angular gripping tongue 48.

The clamp 36 includes an apertured ear 50 which projects laterally from the lower edge 26 of the member in the opposite direction from the lug 38 and has an angular member 52 rigidly affixed to the underside thereof by a rivet 54, the angular member 52 having a depending flange 56 for the reception of the resilient U-shaped clip 58. The U-shaped clip 58 has one of its legs pivoted to the flange 56 by a horizontal pivot pin 60 and has the outer ends of its legs curved outwardly for non-marring engagement of the glass 18.

In installing the air deflector, the window glass 18 is lowered, through the conventional operating mechanism, to a point sufficient for the accommodation of the air deflector, which is vertically interposed between the upper edge of the glass and the frame 16. The clamp 40 is then affixed to the finishing strip of the window frame, with the curved tongue 48 engaged on the upper edge of the strip, the clamp being vertically offset from the leading or forward end 28, so that the forward end is disposed exteriorly of the window glass and will extend diagonally outwardly at an acute angle with the upper window glass edge. The clip 58 is snapped over the upper edge of the glass 18, with the legs straddling the glass and frictionally gripping the opposing sides thereof. Of course, if desired, the inner surfaces of both the clamp and clip could be covered with protective felt or the like. However, the frictional engagement is of such a slight nature, that the finished strip and glass are in no way marred or damaged, during the installing or removal of the deflector.

In use, the leading or forward end, being straight and forming a straight guide member, knifes through the oncoming air currents and deflects the air currents rearwardly into the rearwardly and downwardly inclined air channel, formed by the curved rearward end 30, so that the air currents are directed, as indicated by the arrows in Figure 1, downwardly into the vehicle. In this manner, passengers sitting in the rear seat of the vehicle are cooled by the indirect air currents and no discomfort is experienced from the open windows. Also, foreign particles are prevented from engaging the upper parts of the bodies of the passengers, so that only indirect air currents are present in the rear of the vehicle.

Having thus described this invention, what is claimed:

1. An air deflector for a vehicle side window having a frame and a glass vertically slidable therein comprising a member of flat sheet material adapted to be vertically positioned between the frame and the upper edge of the glass, said member having an upper edge and a lower edge and a straight leading end, a downwardly and laterally curved trailing end on said member, clamp means formed on the upper edge for engagement with the frame and means formed on the lower edge of the member for engagement on the upper edge of the glass, so that the member is positioned with the leading end disposed exteriorly of the glass and extending diagonally outwardly at an acute angle with the glass upper edge and the trailing end positioned interiorly of the glass to form a scoop for directing air currents downwardly into the vehicle.

2. An air deflector for a vehicle side window including a frame and a glass vertically slidable therein comprising a member of flat sheet material adapted to be vertically positioned between the frame and the upper edge of the glass for directing air currents into the vehicle, said member having an upper and lower edge, a clamp formed on the upper edge for engagement on the frame, a rounded rearward end on said member, said rearward end being curved downwardly from its upper edge to form a rearwardly and downwardly directed air channel, a straight forward end on said member, a clamp formed on the lower edge of the member for engagement on the upper edge of the window glass, said clamps mounting said member between the frame and the glass so that the forward end is positioned exteriorly of the glass and extending diagonally outwardly at an acute angle with the glass upper edge and the rearward end is disposed interiorly of the vehicle for directing air currents downwardly into the vehicle.

3. An air deflector for a vehicle side window including a frame and a glass vertically slidable therein comprising a member of flat sheet material adapted to be vertically positioned between the frame and the upper edge of the glass for directing air currents into the vehicle, said member having an upper and lower edge, a clamp formed on the upper edge for engagement on the frame, a rounded rearward end on said member, said rearward end being curved downwardly from its upper edge to form a rearwardly and downwardly directed air channel, a straight forward end on said member, a clamp formed on the lower edge of the member for engagement on the upper edge of the window glass, said clamps mounting said member between the frame and the glass so that the forward end is positioned exteriorly of the glass and extending diagonally outwardly at an acute angle with the glass upper edge and the rearward end is disposed interiorly of the vehicle for directing air currents downwardly into the vehicle, said clamp on the upper edge being pivoted thereto for movement about a vertical axis.

4. An air deflector for a vehicle side window including a frame and a glass vertically slidable therein comprising a member of flat sheet material adapted to be vertically positioned between the frame and the upper edge of the glass for directing air currents into the vehicle, said member having an upper and lower edge, a clamp formed on the upper edge for engagement on the frame, a rounded rearward end on said member, said rearward end being curved downwardly from its upper edge to form a rearwardly and downwardly directed air channel, a straight forward end on said member, a clamp formed on the lower edge of the member for engagement on the upper edge of the window glass, said clamps mounting said member between the frame and the glass so that the forward end is positioned exteriorly of the glass and will extend diagonally outwardly at an acute angle with the upper window glass edge and the rearward end is disposed interiorly of the vehicle for directing air currents downwardly into the vehicle, said clamp on the lower edge being pivoted thereto for movement about a horizontal axis.

5. An air deflector for a vehicle side window including a frame and a glass vertically slidable therein, comprising, a member of flat sheet material adapted to be vertically positioned between the frame and the upper edge of the glass for directing air currents into the vehicle, a straight forward end and a rounded rearward end on said member, said rearward end being curved downwardly from its upper edge to form a rearwardly and downwardly directed air channel, and means for detachably clamping the member on the upper edge of the glass and on the frame so that the forward end is disposed exteriorly of the glass and extending diagonally outwardly at an acute angle with the glass upper edge and the rearward end is disposed interiorly of the vehicle to direct the air currents downwardly into the vehicle.

HARLEY B. RIGGS.

REFERENCES CITED

The following references are of record in the file of this patent:

UNITED STATES PATENTS

| Number | Name | Date |
|---|---|---|
| 1,457,959 | Braucher | June 5, 1923 |
| 2,079,203 | Fagerburg | May 4, 1937 |
| 2,224,433 | Holden | Dec. 10, 1940 |

FOREIGN PATENTS

| Number | Country | Date |
|---|---|---|
| 509,565 | Germany | Apr. 23, 1931 |
| 705,961 | Germany | May 14, 1941 |